United States Patent [19]

Druschel et al.

[11] 3,745,897

[45] July 17, 1973

[54] MASK BIT ERROR INDICATOR

[75] Inventors: William O. Druschel, Granite Springs; Arthur F. Karsch, Yorktown Heights; William C. Schneider, Jr., Hopewell Junction, all of N.Y.

[73] Assignee: International Business Machines Corporation, New York, N.Y.

[22] Filed: June 21, 1971

[21] Appl. No.: 155,030

[52] U.S. Cl. .............................. 95/12, 95/1 R, 96/41
[51] Int. Cl. .............................. G03b 29/00
[58] Field of Search .............................. 95/1 R, 12; 96/41, 96/42, 43, 36.2, 27, 44

[56] References Cited

UNITED STATES PATENTS

| | | | |
|---|---|---|---|
| 3,524,394 | 8/1970 | Sunners | 95/12 |
| 3,632,205 | 1/1972 | Marcy | 95/12 |
| 3,460,448 | 8/1969 | Oliver | 95/1 R |
| 3,674,487 | 7/1972 | Druschel | 96/41 |

*Primary Examiner*—Robert P. Greiner
*Attorney*—Kenneth R. Stevens

[57] ABSTRACT

Apparatus and method for providing a single hard copy photographic recording indicative of mask manufacturing data errors occurring during the transmission of the data to the manufacturer or during the mask making process. A reproducing means is responsive to binary information of a first format for providing an actual circuit pattern mask for use in fabricating a master mask used in the manufacture of semiconductor devices, and the reproducing means also is responsive to binary information of a second format for providing a reference circuit pattern mask. Optical means superimposes the actual circuit mask pattern with respect to the reference circuit mask pattern so as to provide a resultant pattern representation. Photographic means records the resultant pattern representation and provides a single hard copy chiaroscuro print.

2 Claims, 2 Drawing Figures

INVENTORS
WILLIAM O. DRUSCHEL
ARTHUR F. KARSCH
WILLIAM C. SCHNEIDER, JR.

BY Kenneth R. Stevens
ATTORNEY

MASK BIT ERROR INDICATOR

FIELD OF THE INVENTION

This invention relates to the field of mask manufacturing for semiconductor devices, and more particularly to method and apparatus for providing a visual representation in the form of a single hard copy indicative of the accuracy of the mask bit pattern.

DESCRIPTION OF THE PRIOR ART

In the past, it has been necessary for a skilled technician to visually compare the bit pattern on a fabricated integrated circuit mask with a separate standard or desired document. Even when this procedure involves some sort of an overlay comparison, it required the efforts of a skilled technician to make a laborious and painstaking bit-by-bit comparison in order to determine the accuracy of the fabricated mask. This procedure is extremely time consuming and costly. Additionally, this comparison relies on the visual accuity of the person performing the comparison and therefore human errors are very likely.

RELATED INVENTIONS

U. S. application Ser. No. 091972, filed Nov. 23, 1970, assigned to the assignee of the present application, discloses the overall system for automated mask manufacturing. The present invention provides a specific embodiment for the compare and error trace aspects shown generally in the above mentioned application. Also, U. S. application Ser. No. 47,497 now U.S. Pat. No. 3,674,487, also assigned to the assignee of the present application, discloses a distinct and different overlay photographic comparison scheme.

SUMMARY OF THE INVENTION

It is therefore an object of the present invention to provide a mask comparison scheme which provides a single hard-copy product which can be readily interpreted by a non-skilled worker in order to verify the accuracy of the fabricated mask, and also to provide a single hard copy which is easily handled and conveniently storable for future reference.

The foregoing and other objects, features and advantages of the invention will be apparent from the following, more particular description of the embodiment mentioned, as illustrated in the accompanying drawings.

DESCRIPTION OF THE PREFERRED EMBODIMENT

Figures 1, 2:
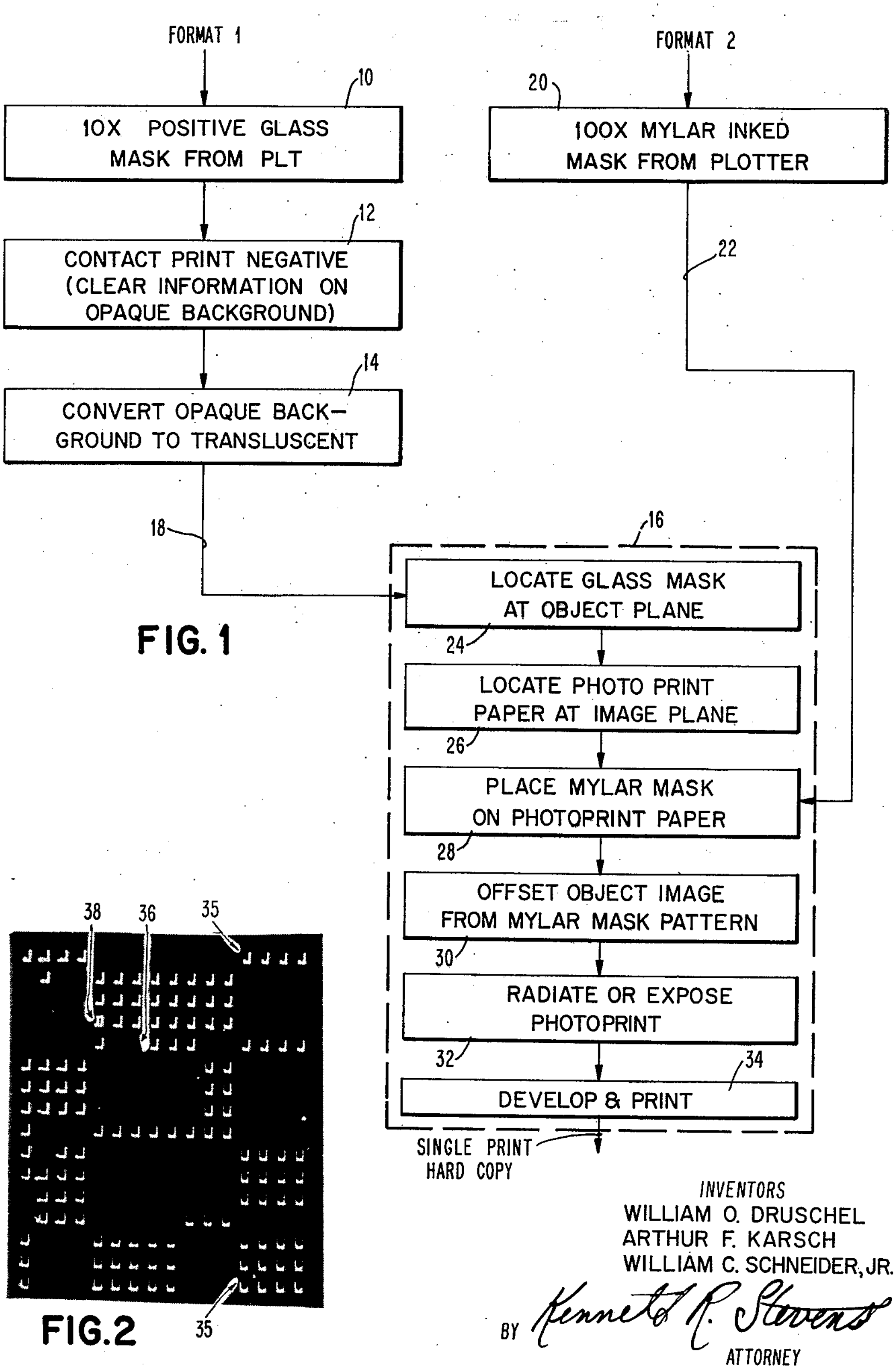
FIG. 1 represents a schematic flow diagram depicting the apparatus and successive steps employed in the subject invention.
FIG. 2 is an actual photographic reproduction representing the single hard copy bit pattern representation, in chiaroscuro, and illustrates accurately formed bit patterns as well as incorrectly formed bits.

Generally, manufacturing of an integrated circuit commences when the customer sends the manufacturer orders for a so-called "Part No.," that is, a particular circuit design. The integrated circuit is a specified truth table designating a bit pattern which defines the functional logic of the required circuit, for example, a 512 bit array comprising "1" and "0" bits.

The manufacturer maintains a stock pile of integrated circuit wafers all having a same layout of active circuits. When the desired bit pattern array is received from a customer, a mask is made with a tab, that is, a 2 × 4 mil rectangle, appearing on the mask wherever a "0" pattern appears in the pattern array. This mask is superimposed on a photoresist layer on the master-slice wafer, the photoresist is exposed to light through the mask, and exposed portions of the photoresist are removed, and the circuit portions under the tabs are etched away, leaving a circuit corresponding to the user's functional requirement.

Since the customer's order consists of a simple bit pattern, it is vulnerable to accidental error such as the loss or interposition of one or more bits. In order to obviate this possibility each order is transmitted from a customer to a manufacturer in two separate and distinct formats. A more detailed description of this general arrangement is found in the previously mentioned U. S. application Ser. No. 091972.

Now referring to FIG. 1, it illustrates the specific apparatus and sequence of steps of one preferred embodiment which may be utilized to perform the compare and error trace function, generally described in U. S. application Ser. No. 091972.

The output from a programmable light table provides a 10X positive glass mask representative of an actual circuit pattern mask, as depicted at 10. This is generated by a FORMAT 1 source of data. This positive glass mask comprises a glass substrate supporting a photographic emulsion. Since this is a positive image, the bit pattern or information is represented by the photographic emulsion being exposed or darkened and the background not exposed or clear. This type of glass mask is generated by standard type of programmable light tables (PLT), readily available in the market.

Next, the positive glass mask is delivered to conventional contact printing means 12 wherein the positive glass mask is converted to a negative print. That is, the bit pattern or data is now converted to clear information on an opaque background.

Then, the negative print from contact printing means 12 is processed at 14. Employing well known techniques the opaque background of the negative print is converted to a translucent state. One means of accomplishing this transformation is to dye the background. In the preferred embodiment which resulted in the hard copy, illustrated in FIG. 2, the background was converted to a translucent state by dyeing it yellow. At this point, an optical comparator means 16 is adapted to receive the translucent bit pattern mask reproduced from the psoitive glass mask, as schematically illustrated by line 18.

It is thus seen that FORMAT 1 digital information is applied to the programmable light table and results in an actual circuit pattern mask representation received at 18. Similarly, a different format of digital information, designated FORMAT 2, is employed to control a plotter schematically shown at 20. Many commercially available plotters are available, and one example of a plotter which is suitable for the present invention is an IBM 1627 plotter. This apparatus is capable of producing a 100X Mylar inked mask as its output. Output line 22 schematically represents a 100X ink mask. The output comprises a Mylar substrate upon which have been drawn inked outlines of the bit pattern.

Both the translucent actual mask representation and the Mylar inked mask are then compared in an overlay configuration by the optical comparator 16.

As represented by block 24, the translucent bit pattern mask is located at the object plane of an optical comparator. Next, standard photoprint paper is located at the image plane of the optical comparator, as depicted at 26. Then, the Mylar inked mask, having an outline of the desired bit patterns, is placed on the photoprint paper, schematically shown at 28. Standard photoprint paper that is normally sensitive to only certain light frequencies is employed. In this example, the photoprint paper is photographically sensitive only to such light frequencies as the blues and the greens, but not sensitive to red light.

At this point, the Mylar mask is interposed between the translucent mask located at the optical comparator object plane and the photoprint paper located at the image plane.

In order to perform the next step, a red source of light is employed to effect a visual realignment. Since the photoprint paper is not sensitive to red light, one is able to make the desired alignment. In the present embodiment, the bit pattern resulting from the translucent mask is magnified 10 times by the optical comparator 16 and thus the object plane contains two visual bit pattern representations. One bit pattern representation results from the magnification of the translucent mask bit pattern, and the other representation comprises the 100X Mylar inked mask copy. In order to obtain the resulting chiaroscuro representation, it is necessary to offset these two bit pattern representations from each other. Therefore, under the influence of the red light the two bit pattern images are slightly offset from each other, as schematically shown at 30.

After the offsetting operation, a radiation or exposure step is performed at 32. A green or blue light is effective to sensitize the photoprint paper. Thereafter, the photoprint paper is developed and printed as shown at 34 in order to provide a single hard copy print containing easily readable chiaruscuro bit patterns.

FIG. 2 is an actual reproduction of a photographic recording of a resultant pattern representation of a bit pattern. The areas 35 indicating a dark region offset from a light or lighter region provide an easily readable chiaruscuro pattern indicative of a correctly formed bit. The black areas only, shown at 36, indicate a pair of bit errors. Such areas can be caused by a correctly formed image on the translucent mask, derived from the positive glass mask, and an omission of a corresponding bit pattern on the Mylar inked mask. The white- or light-only image shown at 38 results from a properly formed bit on the inked Mylar mask, but the omission of a corresponding bit pattern on the translucent mask derived from the positive glass mask. Thus, the single print not only provides an indication of an incorrectly formed bit pattern but also allows some indication as to what point or what part of the system the error might have occurred.

Although not illustrated on the single print hard copy illustrated in FIG. 2, it is possible that a random error would occur and cause a non-uniform or distorted displacement to the chiaruscuro pattern. The chiaroscuro pattern formed by good bit patterns provide a symmetrical light and dark resultant representation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for producing an error-free circuit pattern mask comprising:

a. a source of binary information representative of a circuit pattern, b. reproducing means responsive to the binary information for providing an actual circuit pattern mask for use in fabricating a master mask used in the manufacture of semiconductor devices, and the reproducing means also being responsive to the binary information for providing a reference circuit pattern mask, the actual circuit pattern mask and the reference circuit pattern mask each comprising materials having different translucencies to the passage of light, c. means for superimposing and offsetting the actual circuit pattern mask and the reference circuit pattern mask relative to each other so as to provide a resultant pattern representation, and d. means for photographically recording the resultant chiaruscuro pattern representation for providing a visual print of the presence or absence of errors in the actual circuit pattern mask.

2. An apparatus for producing an error-free circuit pattern mask as in claim 1 wherein:

a. the reproducing means comprises an actual circuit pattern mask generator including a selectively controllable source of light, and means for receiving a photosensitized surface, the photosensitized surface being movable relative to the source of light for providing a positive actual circuit pattern mask, the actual circuit pattern mask generator further including contact printing means for fabricating a negative actual circuit pattern mask from the positive circuit pattern mask, the negative actual circuit pattern mask being of a first magnification size which is at least an order of magnitude greater than that of the master mask used in the manufacture of semiconductor devices, and the reproducing means further including a reference circuit pattern mask generator for providing a positive translucent reference circuit pattern mask, the positive reference circuit pattern mask being at least an order of magnitude larger in size than the negative actual circuit pattern mask, b. means for converting the background of the negative actual mask to a translucent state, c. means for superimposing the negative actual circuit pattern mask having translucent background with respect to the positive translucent reference circuit pattern mask comprising projecting means, so as to produce an offset resultant pattern representation, and d. means for photographically recording said resultant pattern representation including recording means for providing a visual print, the visual print being a chiaroscuro representation indicative of errors in the actual circuit pattern mask.

* * * * *